July 17, 1956  O. R. SCHOENROCK  2,754,694
VARIABLE-TORQUE-DISTRIBUTING TRANSMISSIONS
Filed Sept. 10, 1952  6 Sheets-Sheet 1
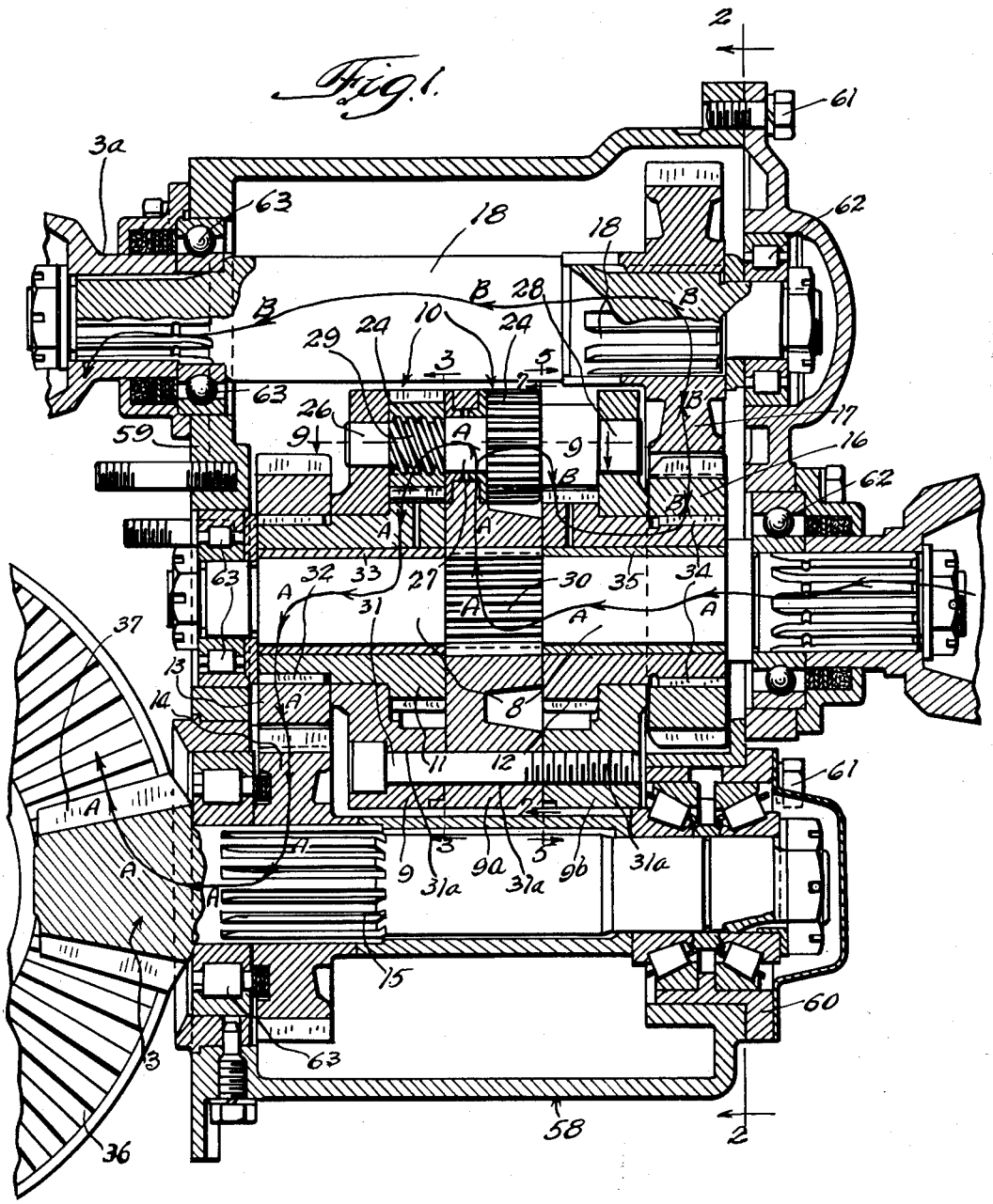
INVENTOR.
Otto R. Schoenrock.
BY
Thiess, Olsen & Mecklenburger
Attys.

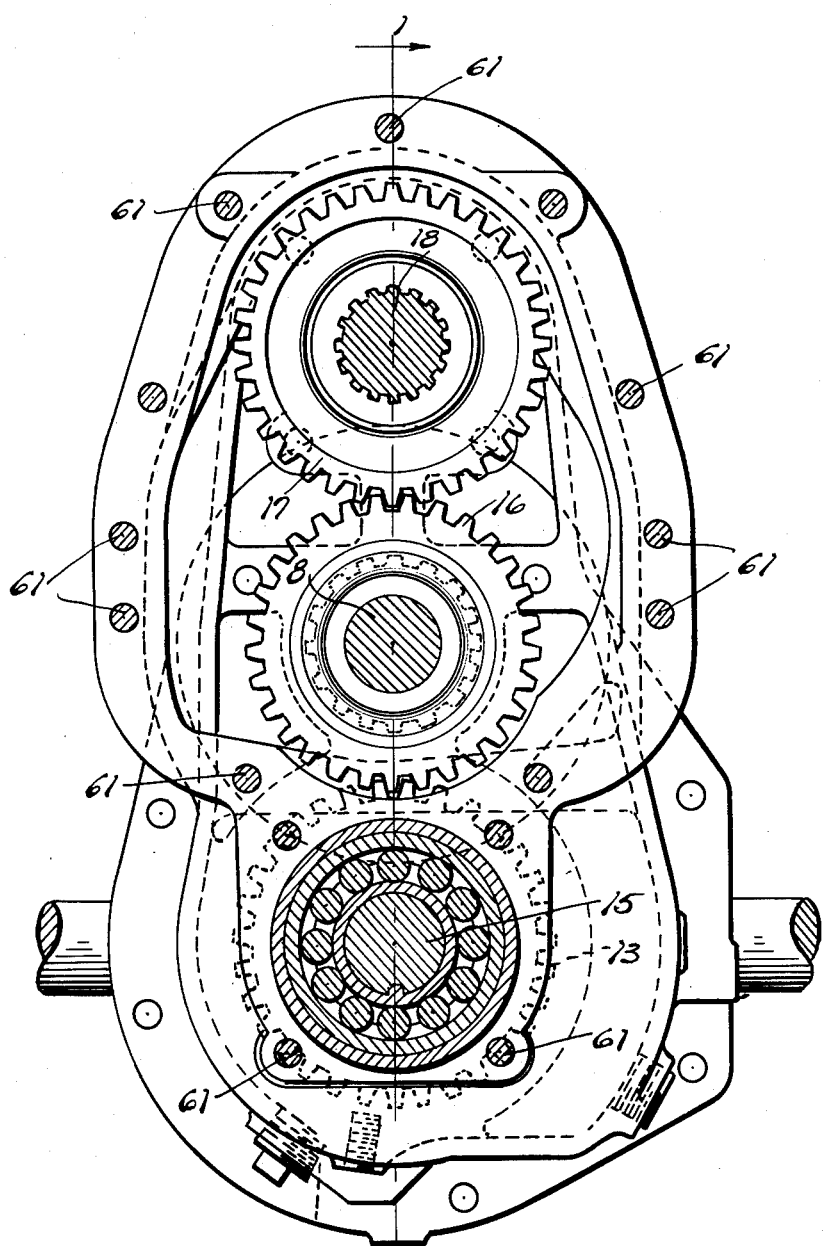

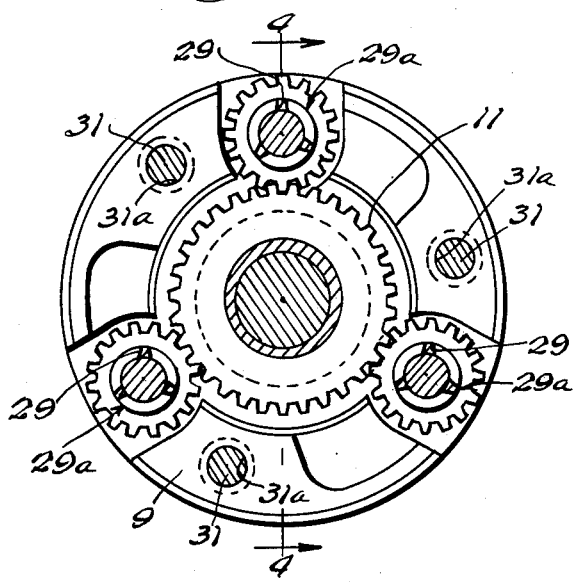
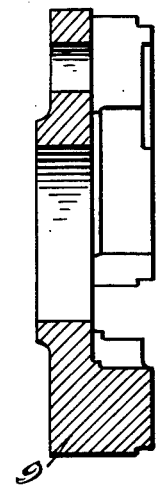
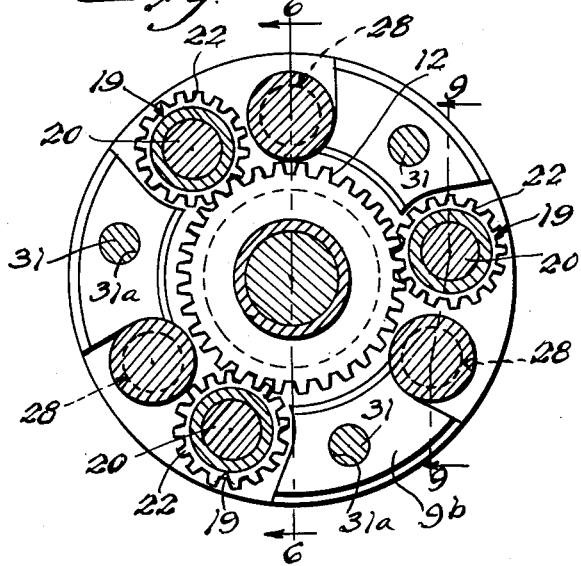
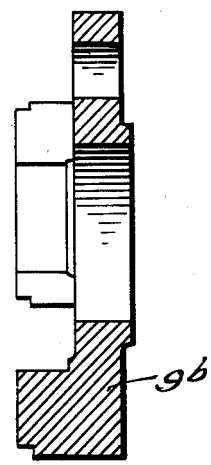

July 17, 1956     O. R. SCHOENROCK     2,754,694
VARIABLE-TORQUE-DISTRIBUTING TRANSMISSIONS
Filed Sept. 10, 1952     6 Sheets-Sheet 4
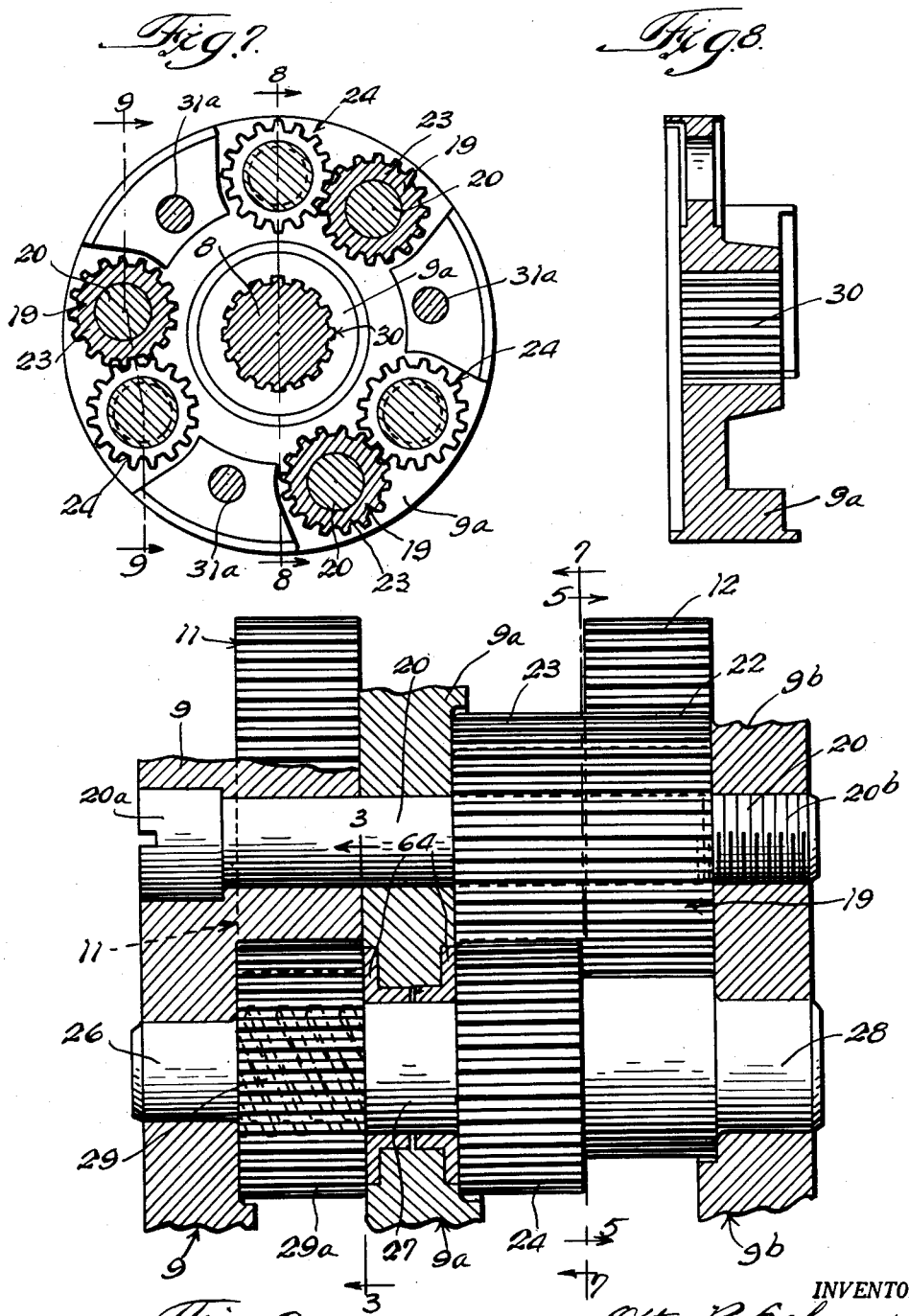
INVENTOR.
Otto R. Schoenrock July 17, 1956     O. R. SCHOENROCK     2,754,694
VARIABLE-TORQUE-DISTRIBUTING TRANSMISSIONS
Filed Sept. 10, 1952     6 Sheets-Sheet 5
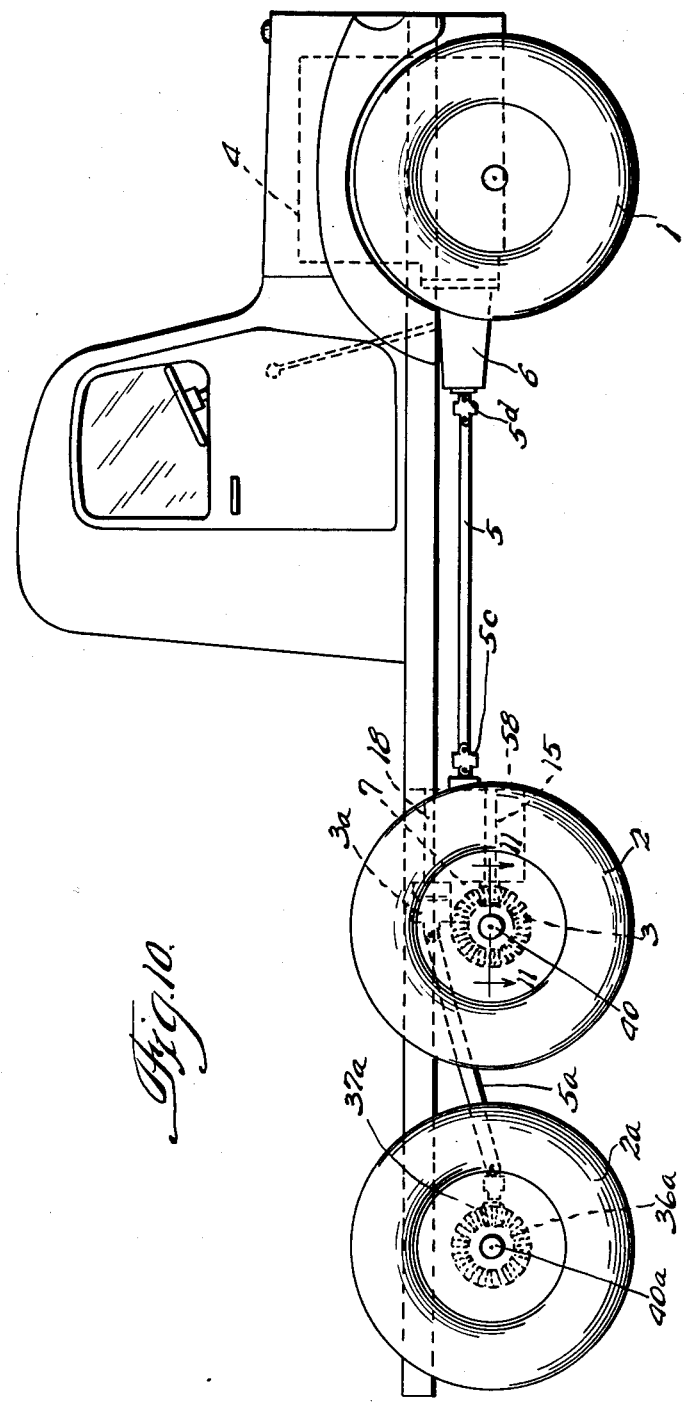
INVENTOR.
Otto R. Schoenrock.
BY
Thiss, Olsen & Mecklenburger.

July 17, 1956  O. R. SCHOENROCK  2,754,694
VARIABLE-TORQUE-DISTRIBUTING TRANSMISSIONS
Filed Sept. 10, 1952  6 Sheets-Sheet 6
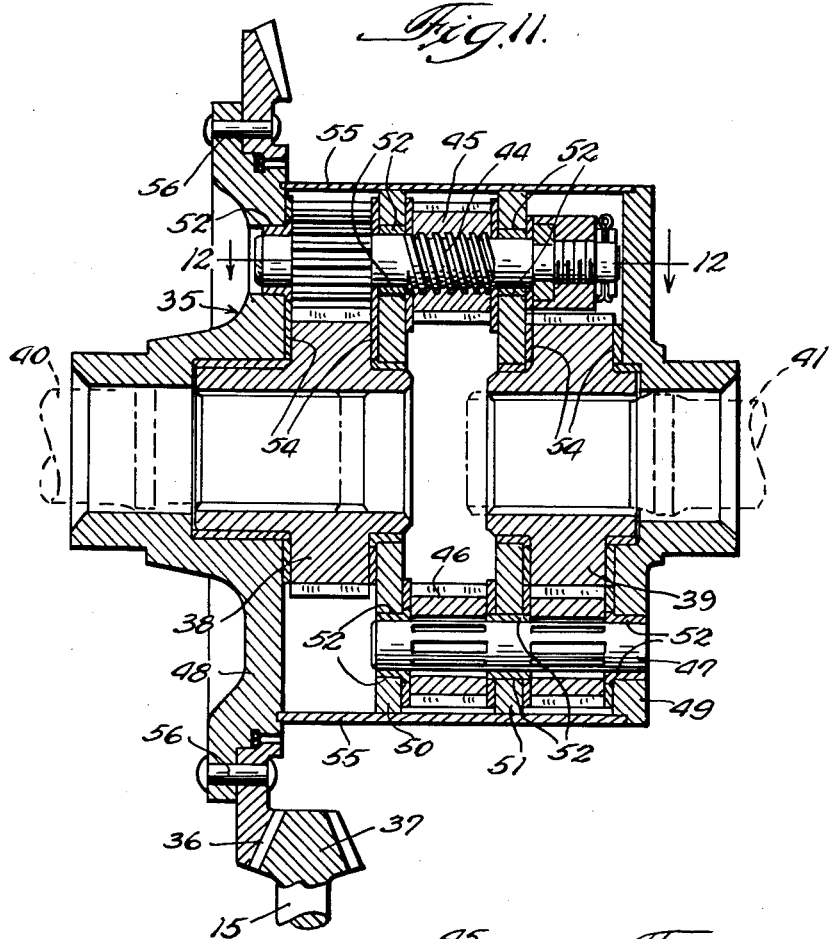
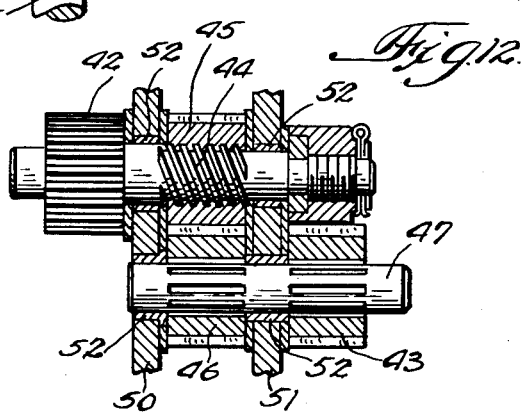
INVENTOR.
Otto R. Schoenrock.

United States Patent Office 2,754,694
Patented July 17, 1956

2,754,694

VARIABLE-TORQUE-DISTRIBUTING TRANSMISSIONS

Otto R. Schoenrock, Oak Park, Ill., assignor to Dualoc Engineering Co., Rockford, Ill., a corporation of Illinois Application September 10, 1952, Serial No. 308,860

3 Claims. (Cl. 74—711)

This invention relates to variable-torque-distributing transmissions.

Among the objects of the invention are to provide an improved variable-torque-distributing transmission to a plurality of transversely extending axles.

A further object is to provide an axle drive of the above type which includes a nut gear threaded on a threaded shaft gear.

A further object is to provide an improved variable-torque-distributing transmission of the internally threaded gear type which can be readily assembled and disassembled.

A further object is to provide an improved axle drive of the above type which will be efficient in operation, rugged in construction, and relatively inexpensive to manufacture.

Further objects and advantages of the invention will be apparent from the description and claims.

In the drawings, in which an embodiment of the invention is shown,

Figure 1 is a fore-and-aft vertical axial sectional view on the line 1—1 of Fig. 2 of the improved transmission showing the main central drive shaft and the upper and lower bogie axle drives;

Fig. 2 is a vertical transverse section on the line 2—2 of Fig. 1;

Fig. 3 is a vertical transverse section on the line 3—3 of Figs. 1 and 9;

Fig. 4 is a vertical section on the line 4—4 of Fig. 3;

Fig. 5 is a vertical transverse section on the line 5—5 of Figs. 1 and 9;

Fig. 6 is a vertical section on the line 6—6 of Fig. 5;

Fig. 7 is a sectional view on the line 7—7 of Figs. 1 and 9;

Fig. 8 is a sectional view on the line 8—8 of Fig. 7;

Fig. 9 is a sectional view substantially on the line 9—9 of Figs. 5 and 7;

Fig. 10 is a side elevation showing a truck with a bogie axle drive;

Fig. 11 is a vertical sectional view on the line 11—11 of Fig. 10, and

Fig. 12 is a sectional view on the line 12—12 of Fig. 11.

The construction shown comprises a bogie axle truck comprising dirigible front road engaging wheels 1, rear drive wheels 2 and 2a, front and rear bogie axle drives 3 and 3a, each leading to a differential transmission, a motor 4, a propeller shaft 5, a variable speed and reverse transmission 6 between the motor and propeller shaft, and a main torque-distributing differential transmission between the propeller shaft and the bogie axle drives 3 and 3a.

The main torque-distributing differential transmission comprises a transmission housing 7, a drive shaft 8 rotatably mounted in said housing and driven from the propeller shaft, a planet pinion carrier, including three generally circular coaxial plate-like sections 9, 9a, and 9b mounted on and rotatable with the drive shaft 8, planetary gearing 10, including two sets of differentially driven planet pinions mounted on said pinion carrier, two spur gears 11 and 12 coaxial with the drive shaft 8 and driven from the planetary gearing 10, and transmission from the two spur gears 11 and 12 to the bogie axle drives 3 and 3a, respectively.

The transmission from the spur gear 11 to the front bogie axle drive 3 comprises a spur gear 13 coaxial with and splined to the spur gear 11 and a spur gear 14 meshing with the spur gear 13 and splined to the shaft 15 of the front bogie axle drive 3.

The transmission from the spur gear 12 to the rear bogie axle drive 3a comprises a spur gear 16 splined to and coaxial with the spur gear 12 and a spur gear 17 meshing with the spur gear 16 and splined to the shaft 18 of the rear bogie axle drive 3a.

Each of the two differentially driven sets of planet pinions comprises three similar angularly spaced sub-sets of planet pinions as indicated in Figs. 3, 5, 7, and 9. One of the two sets serves to transmit variably distributed torque from the drive shaft 8 and the planet pinion carrier 9, 9a, and 9b, to the coaxial spur gear 11 which, as indicated above, is splined to the spur gear 13 which meshes with the spur gear 14 of the front bogie axle drive 3 and the other set serves to transmit variably distributed torque from the drive shaft 8 and planet pinion carrier to the other coaxial spur gear 12 which is splined to the spur gear 16 which meshes with the spur gear 17 of the rear bogie axle drive.

The three angularly spaced sub-sets which transmit torque from the pinion carrier to the spur gear 11 are similar and also the three sub-sets which transmit torque from the pinion carrier to the spur gear 12 are similar. One of the sub-sets which transmits torque to the gear 12 will first be described.

This sub-set includes a duplex planet pinion gear 19 (see Figs. 5, 7, and 9) rotatably mounted on a headed pin 20 extending through openings in the pinion carrier plates 9 and 9a and screwed into the plate 9b. One side 22 of the duplex gear 19 meshes with the spur gear 12, Figs. 5 and 9. The other side 23 of the duplex gear 19 meshes with a planet pinion 24, Figs. 1, 7, and 9, forming part of one of the three sub-sets which transmits torque to the spur gear 11.

The planet pinion 24 has journal portions 26, 27, and 28 rotatably mounted in bearings in the planet pinion carrier plates 9a, 9b and 9c and having a threaded shaft portion 29, Figs. 1, 4, and 9, for engagement with internal threads 29 in the planet pinion 29a, lying between the plates 9 and 9a of the carrier.

The planet pinion carrier plate 9a is splined to the drive shaft 8 at 30. The three planet pinion carrying plates 9, 9a, and 9b are secured to rotate as a unit by the bolts 31. The two coaxial gears 11 and 13 are splined together at 32, Fig. 1, and rotatable as a unit with the bearing sleeve 33 on the shaft 8. The two coaxial gears 12 and 16 are splined together at 34 and rotatable as a unit with the bearing sleeve 35 on the shaft 8.

Between plate 9a and plate 9b are the threaded shaft pinions 24, the gear 12, and the duplex gears 19, meshing with the gear 12 and the pinions 24. Between the plate 9a and the plate 9 are the internally threaded pinions 29a and the gear 11 meshing therewith.

As stated above, the three sub-sets which transmit torque from the planet pinion carrier to the gear 11 are similar and the same reference characters have been applied to all three in the drawings. Also, the same reference characters have been applied to all of the three sub-sets which transmit torque to the gear 11.

Non-torque equalizing differential action

*Equal speed of bogie axle drives.*—As will be explained in detail hereinafter, if conditions are such that the drive shaft 15 for the front bogie axle drive 3 is constrained to rotate at the same speed as the drive shaft 18 for the rear bogie axle drive 3a, the threaded relation between the nut pinions 29a and the externally threaded shafts 29 of the pinions 24 will be such as to cause clamping engagement between the nut pinion 29a and one or the other of the pinion carrier plates 9 or 9a (depending upon whether the central drive shaft 8 is being driven clockwise, as viewed in Fig. 2, for forward drive of the vehicle or counterclockwise for reverse drive).

*Unequal speed of bogie axle drives.*—If conditions are such, due, for example, to the difference in diameter of the tires or to the condition of the roadway, that the drive shaft 18 for the rear bogie axle drive 3a is constrained to rotate at a different speed (either faster or slower than that of the drive shaft 15 for the front bogie axle drive 3), the threaded relation between the nut pinions 29a and the pinions 24 will be such as to cause a releasing action between the nut pinions 24 and the cooperating clamping plates 9 or 9a, depending upon whether the drive is forward or reverse, enabling the planet pinion carrier 9 and 9a, to adjust itself to equalize the torque transmitted to the bogie axle drive shafts 15 and 18.

Power flow

The power flow from the control drive shaft 8 to the front bogie axle drive 3 may be traced by the line of arrows A, from the drive shaft 8 through the united planet carrier plates 9, 9a and 9b, duplex gears 19 journalled thereon (including the pinion 23, Fig. 9), the pinion 24 meshing with the pinion 23 and threaded into the nut pinion 29a, Figs. 4 and 9, and the gear 11 meshing with the pinion 29a, Fig. 5, the gear 13 splined at 32 on the hub of gear 11, Fig. 1, and the gear 14 meshing with the gear 13 and splined on the shaft 15 for the front bogie axle drive 3.

The power flow from the control drive shaft 8 to the rear bogie axle drive 3a may be traced from the planet carrier plates 9, etc., by the line of arrows B, through duplex gears 19 including pinions 22 and journalled in the carrier plates 9, 9a, and 9b, spur gear 12 meshing with the pinion 22, spur gear 16 splined at 34 on the hub of the gear 12, spur gear 17 meshing with the spur gear 16, and shaft 18 on which the spur gear 17 is splined and which drives the rear bogie axle drive 3a.

Bogie axle differential

This differential is in general similar to that shown in the patent to Randall No. 2,481,873, dated September 13, 1949. Each of the divided axles may be provided with its own non-torque-equalizing differential, though this may not always be necessary or advisable.

Referring to the drawings in detail, this construction (shown in Figs. 1, 10, 11, and 12 for the front bogie axle) comprises a rotatable gear carrier 35 which may be driven through the bevel gear 36 from the pinion 37 on the propeller shaft 15 of the front bogie axle drive, two spur gears 38 and 39 coaxial with the rotatable gear carrier 35 and rotatably mounted with respect thereto, to which the axle sections or parts 40 and 41 of the ground engaging wheels 2 and 2a may be splined, respectively, and transmission between said gear carrier 35 and axle spur gears 38 and 39 comprising a plurality of pairs of spur gears, one gear 42 of each pair meshing with the axle gear 38 and the other gear 43 of each of said pairs meshing with the other axle gear 39, a plurality of externally threaded shafts 44 rotatable, respectively, with one of the spur gears 42, a plurality of internally threaded spur gears 45, one threaded on each shaft 44, a plurality of spur gears 46 meshing, respectively, with said internally threaded spur gears 45 and rotatable, respectively, with the gears 43, and means for limiting the threading movement of said threaded gears 45 on said threaded shafts 44 to lock the threaded gears and threaded shafts to the gear carrier 35.

The gears 46 and 43 are keyed to the shafts 47. The gear carrier 35 comprises two end bearing plates 48 and 49 and two intermediate bearing plates 50 and 51. The shafts 44 and 47 are journalled in bearings 52 in these bearing plates 48, 49, 50, and 51. These bearing plates are also provided with suitable antifriction thrust collars or washers 54. The gears 38 and 39 are also provided with suitable antifriction collars 54.

In order to prevent oil leakage and in order to stiffen up the construction, a suitable cylindrical shell 55 may be slipped over the bearing plates 50 and 51 and clamped in position between the flanges of the plates 48 and 49. The bevel gear 36 may be held in position on the plate 48 by means of suitable rivets 56, or the like.

In use, if one ground-engaging wheel has traction and the other does not power is being applied to turn the gear carrier 35, the threaded gears 45 will rotate slightly, due to the road resistance of the ground wheel which has traction until each of these internally threaded gears has rotated sufficiently to cause it to clamp one or the other of the bearing plates 51 or 50 between either the shouldered collar 57 or the shouldered gear 42 to lock the internally threaded gear 45, the gears 46 and 43, the threaded shaft 44 and the gear 42 against further rotation with respect to the gear carrier. Further driving force of the gear carrier will be transmitted directly to the axle gear and axle part (40 or 41) of that wheel which has traction, through one or the other of the locked spur gears 42 or 43, regardless of the fact that one of the ground-engaging wheels has no tractive effect.

When both ground wheels have tractive effect and the vehicle is travelling a straight course, power will be transmitted equally to both ground wheels. If the vehicle is going around a corner and one or the other of the ground-engaging wheels has to precess, the driving effort will still be transmitted differentially to both wheels, the gear carrier 35 precessing as required with respect to the lagging ground wheel.

General variable torque distributing action

It follows from the construction described that the overall variable torque distribution to the four drive wheels 2a is such that if any one of them has good nonslipping ground engagement and none of the other three wheels has, the major portion of the torque from the propeller shaft 5 will be transmitted to that drive wheel which has good nonslipping ground engagement. If any two wheels have good nonslipping engagement and the other two do not, the major portion of the torque will be transmitted to the two wheels which have good ground engagement. If three wheels have good ground engagement, a proportion of torque will be transmitted to the fourth wheel depending on the pitch of the internally threaded gears 45.

Details

The transmission housing 7 (Figs. 1, 2, and 10) comprises a housing 58 having an integral head 59 at its rear end and a detachable head 60 at its front end, in which housing the main torque distributing transmission is mounted. The front head 60 may be secured to the receptacle by means of cap screws 61. The three parallel shafts 8, 15, and 18 are mounted in anti-friction bearings 62 and 63 in the front and rear bearing supporting heads or plates 59 and 60, respectively.

The journals of the pinions 24 are mounted in anti-friction radial and end pressure bearings 64 in the planet pinion plate 9a (see Fig. 9). These plates 9a, 9b, and 9c are held together by means of the bolts or cap screws 31 extending through openings 31a in these plates (Figs. 1, 3, 5, and 7).

The drive for the rear bogie axle sections 40a is substantially the same as that described in connection with the front bogie axle sections 40 and 41. The gear 36a and pinion 37a which drive the rear axle sections 40a correspond to the gear 36 and pinion 37 which drive the front axle sections 40 and 41, as shown in Fig. 10. The drive from the rear bogie axle drive 3a to the pinion 37a is through the drive shaft 5a which has suitable universal joint connections 5b, 5c, with the rear bogie axle drive 3a and rear bogie axle drive pinion 37a.

The main propeller shaft 5 may have universal joint connections at 5d and 5e with the transmission 6 and main drive shaft 8, respectively.

*Assembly of gear carrier plates 9, 9a, and 9b and planet gearing*

Each nut gear 29a (see Fig. 9) is placed in registration with an opening in the bearing 64 of the carrier plate 9a. A journal portion 27 of the shaft of the pinion 24 is inserted through an opening in the bearing 64 and the threaded portion 29 of the shaft is threaded into the nut gear 29a, to bring the pinion 24 and nut gear 29a into engagement with the bearing 64. The plate 9 of the gear carrier is then placed in position so that the journal portions 26 register with the corresponding journal openings in the plate 9 and the plate 9 is slipped on over the ends of the journal portions 26. The pins 20 are then inserted into place through the corresponding registering openings in the plates 9 and 9a. The duplex gears 19 are then slipped into place against the plate 9a over the threaded ends 20b of the pins 20. The plate 9b is then brought into registration with the threaded ends 20b of the pins 20 and the heads 20a of the pins are turned to screw the threaded ends of the pins into corresponding threaded openings in the plate 9b. This clamps the plates 9, 9a, and 9b together and holds them in proper position relative to each other and to the gearing supported by these plates.

Further modifications will be apparent to those skilled in the art and it is desired, therefore, that the invention be limited only by the scope of the appended claims.

Having thus described my invention, what I claim and desire to secure by Letters Patent is:

1. A differential comprising a drive shaft, means for variably distributing torque from said drive shaft, comprising a planet pinion carrier rotatable with said drive shaft, planetary gearing mounted on said gear carrier, two gears coaxial with said drive shaft and rotatable with respect thereto, said planetary gearing comprising an internally threaded pinion and a pinion having a threaded shaft threaded into the first said pinion and brought into rotation-retarding position with respect to said pinion carrier by relative rotation of said pinions and force-transmittent means between one of said two pinions and one of said two gears, the other pinion meshing with the other of said two gears, said force-transmittent means comprising a duplex planet pinion having one pinion portion meshing with said one of said two pinions and its other pinion portion meshing with said one of said two gears, said pinion carrier comprising two generally circular end plates and a generally circular intermediate plate coaxial and rotatable with said intermediate drive shaft, said internally threaded pinion being mounted between one end plate and the intermediate plate, said threaded shaft pinion being mounted between the other end plate and the intermediate plate, both said duplex pinion portions being mounted between said other end plate and the intermediate plate.

2. A differential comprising a drive shaft, and means for variably distributing torque from said drive shaft, comprising a planet pinion carrier rotatable with said drive shaft, planetary gearing mounted on said gear carrier, with said two gears coaxial with said drive shaft and rotatable with respect thereto, said planetary gearing comprising an internally threaded pinion and a pinion having a threaded shaft threaded into the first said pinion and brought into rotation-retarding position with respect to said pinion carrier by relative rotation of said pinions and force-transmittent means between one of said two pinions and one of said two gears, the other pinion meshing with the other of said two gears, said force-transmittent means comprising a duplex planet pinion having one pinion portion meshing with said one of said two pinions and its other pinion portion meshing with said one of said two gears, said pinion carrier comprising two generally circular end plates and a generally circular intermediate plate coaxial and rotatable with said intermediate drive shaft, said internally threaded pinion being mounted between one end plate and the intermediate plate, said threaded shaft pinion being mounted between the other end plate and the intermediate plate, both said duplex pinion portions being mounted between said other end plate and the intermediate plate, said threaded shaft pinion having journal portions rotatably mounted in all three plates.

3. A differential comprising a drive shaft, means for variably distributing torque from said drive shaft, comprising a planet pinion carrier rotatable with said drive shaft, planetary gearing mounted on said gear carrier, two gears coaxial with said drive shaft and rotatable with respect thereto, said planetary gearing comprising an internally threaded pinion and a pinion having a threaded shaft threaded into the first said pinion and brought into rotation-retarding position with respect to said pinion carrier by relative rotation of said pinions and force-transmittent means between one of said two pinions and one of said two gears, the other pinion meshing with the other of said two gears, said force-transmittent means comprising a duplex planet pinion having one pinion portion meshing with said one of said two pinions and its other pinion portion meshing with said one of said two gears, said pinion carrier comprising two generally circular end plates and a generally circular intermediate plate coaxial and rotatable with said intermediate drive shaft, said internally threaded pinion being mounted between one end plate and the intermediate plate, said threaded shaft pinion being mounted between the other end plate and the intermediate plate, both said duplex pinion portions being mounted between said other end plate and the intermediate plate, and means for securing said plates together comprising a pin extending through all three plates, on which pin said duplex pinion is rotatably mounted.

References Cited in the file of this patent

UNITED STATES PATENTS

| | | |
|---|---|---|
| 1,262,562 | Reiche | Apr. 9, 1918 |
| 1,716,073 | McFarlane | June 4, 1929 |
| 1,956,583 | Morgan | May 1, 1934 |
| 2,103,624 | Lester | Dec. 28, 1937 |
| 2,309,441 | Cook | Jan. 26, 1943 |
| 2,479,638 | Randall | Aug. 23, 1949 |
| 2,481,873 | Randall | Sept. 13, 1949 |
| 2,536,392 | Randall | Jan. 2, 1951 |
| 2,603,108 | Carlson | July 15, 1952 |